United States Patent [19]

Liu et al.

[11] Patent Number: 4,735,993

[45] Date of Patent: Apr. 5, 1988

[54] BINARY POLYCARBONATE BLENDS

[75] Inventors: Ping Y. Liu, Naperville, Ill.; Toshio Ishihara, Evansville, Ind.

[73] Assignee: General Electric Company, Mt. Vernon, Ind.

[21] Appl. No.: 942,318

[22] Filed: Dec. 16, 1986

[51] Int. Cl.$^4$ .............................................. C08L 69/00
[52] U.S. Cl. .................................... 525/148; 525/146
[58] Field of Search ...................... 525/148, 468, 146

[56] References Cited

U.S. PATENT DOCUMENTS 4,324,869  4/1982  Robeson ................... 525/68
4,496,693  1/1985  Rosenquist et al. ........ 525/146
4,532,282  7/1985  Liu et al. .................. 524/157
4,604,423  8/1986  Liu ........................... 524/508

Primary Examiner—Theodore Pertilla
Attorney, Agent, or Firm—John Schneller; Martin B. Barancik

[57] ABSTRACT

A composition comprising an admixture of:
(a) at least one high molecular weight aromatic carbonate resin; and
(b) an impact modifying, gasoline solvent resistant effective amount of an ethylene alkylacrylate wherein alkyl is from one to six carbon atoms, inclusive, and the ethylene is from about 55 to 75 weight percent aand the alkylacrylate is from about 25 to 45 weight percent, based on the ethylene alkylacrylate polymer.

8 Claims, No Drawings

BINARY POLYCARBONATE BLENDS

FIELD OF THE INVENTION

The invention relates to binary blends of polycarbonate and ethylene ethyl acrylate resins having improved physical properties.

BACKGROUND OF THE INVENTION

Blends of polycarbonate with either polyolefin or modified polyolefin resins are well known and used in a variety of applications because inter alia of their superior impact strength compared to unblended polycarbonate resins. For example, blends of polycarbonate and a variety of polyolefin resins are described in U.S. Pat. No. 3,431,224 to Kenneth B. Goldblum. As described therein, admixtures of polycarbonate including at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether, and a polyurethane elastomer exhibit improved solvent resistance and impact strength. While the results with these additives are generally good in thick section, e.g. 6.4 mm, it has been found that there is a tendency for failure to occur with these blends after exposure to high test gasoline.

U.S. Pat. No. 4,260,693 to Ping Y. Liu describes ternary polycarbonate compositions having improved impact srength. These ternary compositions comprise a mixture of an aromatic polycarbonate, and olefin-acrylate copolymer, and an acrylate copolymer. These ternary blends exhibit improved low temperature impact strength and improved aged impact strength. The olefin acrylate is ethylene ethylacrylate 82:18 (ethylene: ethylacrylate) weight percent.

SUMMARY OF THE INVENTION

Accordingly, it is a principal object of the present invention to improve the impact resistance of admixtures of polycarbonate, especially in thicker molded parts, with ethylene alkyl, preferably ethyl, acrylate resins.

Another object of the present invention is to improve the impact resistance of admixtures of polycarbonate with ethylene alkyl, preferably ethyl, acrylate, after exposure to gasoline.

According to the present invention, there is disclosed a thermoplastic resin composition in admixture with a polycarbonate, and a copolymer of ethylene and alkyl acrylate. It has now been found that the addition of a copolymer of ethylene and ethyl acrylate to a polycarbonate unexpectedly improved the impact resistance of the blended mixture, especially in thicker molded parts, 6.4 mm, and that the impact resistance of the 3.2 mm molded part is surprisingly high after exposure to gasoline.

This is particularly surprising since the ethylene ethylacrylate has a significantly reduced quantity of ethylene and an increased quantity of acrylate in comparison to prior employed ethylene ethylacrylates. Generally, more polyolefin in a polycarbonate blend means greater resistance to organic solvents such as gasoline while acrylates such as KM 330, available from Rohm and Haas, are generally more soluble in gasoline.

DETAILED DESCRIPTION OF THE INVENTION

The polycarbonate resin used in the binary blends of the present invention is an aromatic carbonate polymer which may be prepared by reacting a dihydric phenol with a carbonate precursor such as phosgene, a haloformate, or a carbonate ester. Generally speaking, such aromatic carbonate polymers may be typified as possessing recurring structural units of the formula:

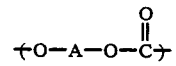

wherein A is a divalent aromatic radical of the dihydric phenol employed in the polymer producing reaction. Preferably, the aromatic carbonate polymers used in the binary blends of the present invention have an intrinsic viscosity (as measured in methylene chloride in deciliters per gram at 25° C.) ranging from about 0.30 to about 1.00. The dihydric phenols which may be employed to produce such aromatic carbonate polymers are mononuclear or polynuclear aromatic compounds, containing as functional groups two hydroxy radicals, each of which is attached to a carbon atom of an aromatic nucleus. Typical dihydric phenols are:
2,2-bis-(4-hydroxyphenyl)propane; hydroquinone; resorcinol;
2,2-bis-(4-hydroxyphenyl)pentane;
2,4′-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-diethyl-4-hydroxyphenyl)sulfone;
2,2-bis-(3,5-dimethyl-4-hydroxyphenyl)propane;
2,4′-dihydroxydiphenyl sulfone;
5′-chloro-2,4′-dihydroxydiphenyl sulfone;
bis-(4-hydroxyphenyl)diphenyl sulfone;
4,4′-dihydroxydiphenyl ether;
4,4′-dihydroxy-3,3′-dichlorodiphenyl ether;
4,4′-dihydroxy-2,5-dimethoxydiphenyl ether;
and the like.

Other dihydric phenols which are also suitable for use in the preparation of the polycarbonates used in the present invention are disclosed in U.S. Pat. Nos. 2,999,835; 3,038,365; 3,334,154; and 4,131,575. The preferred dihydric phenol is 2,2-bis(4-hydroxyphenyl) propane (bisphenol-A).

These aromatic polycarbonates can be manufactured by known processes, for example and as mentioned above, by reactng a dihydric phenol with a carbonate precursor, such as phosgene, in accordance with the methods set forth in the above-mentioned parent publications, and in U.S. Pat. Nos. 4,018,750 and 4,123,436, or by other processes known to those skilled in the art.

Included within the present definition of polycarbonates which may be used to form the binary blends of the present invention are also the copolyestercarbonates. The copolyestercarbonates are polymers derived from a dihydric phenol, a carbonate precursor, and an ester precursor such as a difunctional carboxylic acid or an ester forming reactive derivative thereof. These copolyestercarbonate resins as well as methods for their preparation, are disclosed inter alia, for example in U.S. Pat. Nos. 3,169,121; 4,465,820 and 4,506,065, which are incorporated herein by reference.

The ethylene alkylacrylates useful in this invention have a reduced quantity of ethylene and an increased quantity of alkyl acrylate, usually ethylacrylate. Alkyl as used in this specification is from one to about six carbon atoms. In the ethylene alkyl acrylates of the invention, the ethylene is from about 55 to about 75 weight percent of the ethylene alkyl acrylate, preferably alkyl is ethyl, and the alkylacrylate is about 25 to 45 weight percent of the molecule. Nippon Union Carbide's MB 870 and MB 910 ethylene ethyl acrylate copolymers are suitable for use in the present invention. MB 870 contains an ethylene/ethyl acrylate weight ratio of 59/41, and MB 910 contains an ethylene/ethyl acrylate weight ratio of 72/28. The preparation of copolymers of ethylene with an alkyl ester of acrylic acid is disclosed in U.S. Pat. No. 2,953,551, incorporated herein by reference. Preferably, the ethylene ethyl acrylate copolymers used in the present invention contain from abut 57 to about 68 weight percent by weight ethylene, and from about 32 to about 43 weight percent alkyl acrylate.

The ratio of ethylene alkyl acrylate to polycarbonate in the binary blends of the present invention is sufficient to impact modify the polycarbonate. Such an amount is generally within the range of about 2 to about 15 weight percent with reference to the total weight of polycarbonate and ethylene ethyl acrylate. Preferably the quantity of ethylene ethyl acrylate to polycarbonate is from about 3 and about 12%, and most preferably it is from about 4 and about 10%.

Within the broad composition ranges specified above, many resin mixtures may be prepared in accordance with the subject invention which unexpectedly improve the impact resistance of the blended mixture, resulting in improved physical properties.

The compositions of the present invention may be prepared by dry blending the aromatic carbonate polymer resin component, and the ethylene ethyl acrylate component until complete dispersion of all of the ingredients is obtained. The resin mixture is then extruded and chopped to form pellets and thereafter molded in accordance with conventional methods.

The resistance to impact failure of the polycarbonate resin mixtures prepared in accordance with the subject invention was determined with the Notched Izod Impact Test, ASTM D256 on molded test specimens in the form of bars of two sizes:

63.5 mm × 12.7 mm × 3.2 mm 63.5 mm × 12.7 mm × 6.4 mm

The latter dimension being the specimen thickness. The test specimens were mounted in accordance with ASTM D256 procedures and were tested at room temperature. Izod impact strengths were determined for all specimens according to ASTM D256 procedures on notched specimens and are reported in kg.-cm/cm of notch. In the resistance to gasoline tests, the Izod bars were mounted on an ASTM stress jig (1% strain/240 kgf/cm$^2$) and soaked for two hours at room temperature in AMOCO ® premium unleaded gaoline. The specimens were removed from the jig, the gaoline allowed to evaporate at room temperature for 24 hours, and then subjected to the Notched Izod test, ASTM D256. The results are set forth in Table II. Similar specimens were subjected to the Notched Izod test without having been soaked in gaoline. The results of these tests are also set forth in Table II.

The binary blends of the present invention may be defined as mixtures of a polycarbonate resin and an ethylene ethyl acrylate copolymer with no covalent bonds between them.

DESCRIPTION OF THE PREFERRED EMBODIMENTS

In order that those skilled in the art may better understand how the present invention may be practiced, the following Examples are given by way of illustration and not by way of limitation. All parts and percentages are by weight unless otherwise noted.

In Table I, the binary blend of resins contained LEXAN ® polycarbonate resin with an intrinsic viscosity of 0.46 to 0.49 dl/g in methylene chloride at 25° C. and a copolymer of ethylene and ethyl acrylate as indicated in the Table.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

TABLE I

| EXAMPLE | PC | EEA WT. % (E/EA WT. %) | NOTCHED IZOD (kg.-cm./cm.) 3.2 mm | 6.4 mm |
|---|---|---|---|---|
| Control | 100 | 0 | 80.6 | 8.7 |
| 1 | 96 | 4 (82/18)$^a$ | 65.9 | 56.6 |
| 2 | 90 | 10 (82/18)$^a$ | 63.7 | 55.5 |
| 3 | 96 | 4 (72/28)$^b$ | 84.4 | 75.1 |
| 4 | 90 | 10 (72/28)$^b$ | 83.3 | 60.4 |
| 5 | 96 | 4 (59/41)$^c$ | 81.1 | 68.6 |
| 6 | 90 | 10 (59/41)*$^c$ | 84.8 | 61.0 |

$^a$Union Carbide DPD 6169
$^b$MB 910
$^c$MB 870
*All previous examples blended on single screw extruder. Example 6 was difficult to process on single screw extruder but did process on a twin screw extruder.

The standard ethylene alkylacrylate composition used in this test system, Examples 1 and 2, lowered somewhat the 3.2 mm impact value and raised the 6.4 mm thick section impact value. However the Examples with the reduced ethylene and increased acrylate, Examples 3-6, brought about slightly increased 3.2 mm values and significantly increased 6.4 mm thick section impact values in comparison to Examples 1 and 2.

TABLE II

| EXAMPLE | PC WT. % | EEA WT. % (E/EA WT. %) | NOTCHED IZOD (kg.-cm./cm.) BEFORE SOAKING 3.2 mm | AFTER SOAKING 3.2 mm |
|---|---|---|---|---|
| Control | 100 | — | 80.6 | broke |
| 7 | 94 | 6 (82/18) | 80.6 | 7.1 |
| 8 | 90 | 10 (72/28) | 40.8 | 40.8 |
| 9 | 90 | 10 (59/41) | 85.5 | 78.4 |

After exposure to gasoline, the 100% polycarbonate broke with no impact. The Example 7 using a high ethylene low acrylate EEA lost virtually all of its impact resistance. However, the examples of invention with decreased olefin content and increased acrylate content show very little if any loss in impact resistance after exposure to gasoline under stress.

What is claimed is:

1. A binary composition consisting essentially of an admixture of:
   (a) at least one high molecular weight aromatic carbonate resin; and
   (b) an impact modifying, gasoline solvent resistant effective amount of an ethylene alkylacrylate wherein alkyl is from one to six carbon atoms, inclusive, and the ethylene is from about 55 to 75 weight percent and the alkylacrylate is from about 25 to 45 weight percent, based on the ethylene alkylacrylate polymer.

2. The composition in accordance with claim 1 wherein the resin is an aromatic polycarbonate resin.

3. The composition in accordance with claim 1 wherein the alkyl is ethyl.

4. The composition in accordance with claim 2 wherein the alkyl is ethyl.

5. The composition in accordance with claim 4 wherein the ethylene is about 57 to 68 weight percent and the ethyl acrylate is from about 32 to 43 weight percent.

6. The composition in accordance with claim 4 wherein the ethylene alkylacrylate is from about 2 to 15 weight percent of the polycarbonate plus ethylene ethylacrylate.

7. The composition in accordance with claim 6 wherein the ethylene alkylacrylate is from about 3 to 12 weight percent.

8. The composition in accordance with claim 7 wherein the ethylene alkylacrylate is from about 4 to 10 weight percent.

* * * * *